United States Patent [19]

Miller et al.

[11] Patent Number: 4,657,642

[45] Date of Patent: * Apr. 14, 1987

[54] DIRECT GOLD ELECTROLYSIS FROM A LOADED ORGANIC PHASE

[75] Inventors: Jan D. Miller; Rong-yu Wan, both of Salt Lake City, Utah

[73] Assignee: University of Utah, Salt Lake City, Utah

[*] Notice: The portion of the term of this patent subsequent to Sep. 10, 2002 has been disclaimed.

[21] Appl. No.: 774,548

[22] Filed: Sep. 10, 1985

Related U.S. Application Data

[63] Continuation-in-part of Ser. No. 527,311, Aug. 26, 1983, Pat. No. 4,540,435.

[51] Int. Cl.$^4$ ................................................. C25C 1/00
[52] U.S. Cl. .................................... 204/59 M; 204/110

[58] Field of Search ................ 204/110, 59 M; 423/24

[56] References Cited

U.S. PATENT DOCUMENTS

| | | | |
|---|---|---|---|
| 3,920,403 | 11/1975 | Ross | 204/110 |
| 4,372,830 | 2/1983 | Law | 204/110 |
| 4,468,303 | 8/1984 | Griffin et al. | 204/110 |
| 4,540,435 | 9/1985 | Miller et al. | 423/24 |
| 4,554,058 | 11/1985 | Lei et al. | 204/110 |

*Primary Examiner*—R. L. Andrews
*Attorney, Agent, or Firm*—Trask, Britt & Rossa

[57] ABSTRACT

A technique for extracting gold or silver values from an organic liquid having phosphorus or sulfur oxide groups which contains silver or gold cyanide ions by direct electrolytic deposition from the organic phase onto a cathode is disclosed.

15 Claims, 3 Drawing Figures

DIRECT GOLD ELECTROLYSIS FROM A LOADED ORGANIC PHASE

RELATED APPLICATIONS

This application is a continuation-in-part of U.S. Ser. No. 527,311, filed Aug. 26, 1983, entitled "Solvent Extraction of Gold and Silver Anions Under Alkaline Conditions," now U.S. Pat. No. 4,540,435, which is related to U.S. Ser. No. 526,423, filed Aug. 25, 1983, entitled "Ion Exchange Extraction of Metallic and Non-Metallic Anions by Control of the Basicity of Amine Extractants," filed by one of the co-inventors, the contents of said applications being incorporated herein by reference. This application is also related to U.S. Ser. No. 774,549, filed Sept. 10, 1985, entitled "Composition for Extracting Gold and Silver Anions From Alkaline Solution and Processes for Making Same," which is also a continuation-in-part of U.S. Pat. No. 4,540,435.

BACKGROUND OF THE INVENTION

1. Field

The present invention relates to the recovery of gold or silver values from an organic liquid or mixed organic/aqueous phase liquids by direct electrowinning of such liquid.

2. Prior Art

Extraction of metal values from aqueous systems by means of ion exchange techniques such as solvent extraction has achieved prominence in hydrometallurgical processing technology.

Ion exchange and solvent extraction are widely used in hydrometallurgy and water purification. Solvent extraction which is carried out by various organic liquid extractants, with or without diluents or modifiers, has been used in hydrometallurgy for the recovery of uranium, copper, and other metals. Synthetic resins which contain functional groups similar to those used in solvent extraction are also widely used for waste water purification and in hydrometallurgy for the separation of metallic ions. The use of resins with active functional groups is a form of extraction that involves a solid substrate. Such a substrate may be, but need not be, active in the ion extraction process. It may function merely as a carrier for an active extractant.

Recovery of metal values from aqueous systems by organic acids, amines, phosphorus oxide compounds, and the like is frequently accomplished from acidic systems. Such extraction is conducted in systems having a pH of less than 7.

Solvent extraction of gold from alkaline solutions has not been practiced heretofore in industry. Laboratory experiments reported in the literature indicate that the extraction of gold from cyanide solutions is possible with weak base amines and neutral extractants such as long chain alcohols, ketones, and the like under acidic conditions.

Extraction of metal values from cyanide systems is generally not practiced industrially inasmuch as cyanide gas may evolve at low pH conditions in which solvent extraction procedures employing amines and the like have been practiced.

In some cases, such as copper, the hydrometallurgical process involves solvent extraction with an organic solution. Subsequently, the metal is stripped from the organic phase into an aqueous phase from which recovery can be achieved frequently by electrolysis.

In the case of gold cyanidation plants, the metal is typically recovered from carbon adsorption eluates by electrowinning from an alkaline solution using steel wool cathodes. Electrical current efficiencies vary from 20% to 50%. The gold which is deposited on steel wool cathodes is impure and has to be further refined by smelting to dorébullion. Also, alkaline cyanide solutions are used in gold electroplating processes which manufacture consumer products. The gold content of these solutions is the major factor which influences the cathodic current efficiency. Low gold concentrations as well as the accumulated impurities in the electroplating solution significantly decrease the current efficiency and the quality of the gold product. From such waste gold electroplating solutions typically an impure gold product is recovered by reduction prior to recycle and/or disposal.

3. Disclosure of Related Applications

A method for extracting gold and silver values from an aqueous system through employment of a solvating extractant under basic conditions has been invented and is the subject of the parent application herein incorporated by reference. In particular, organic oxides of phosphorus and sulfur present as groups pendant from a neutral resinous material are used as extractants for recovering gold and silver from aqueous systems containing gold or silver cyanide anions. Stripping of metal values from the solvating extractant has heretofore been accomplished by temperature adjustment, ionic strength adjustment, or extraction with an appropriate solvent.

DESCRIPTION OF THE INVENTION

Figure 1:
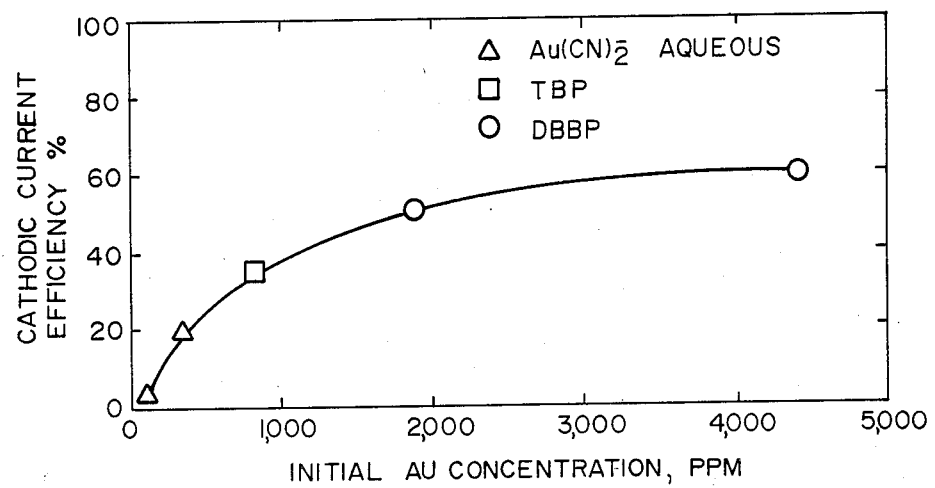
FIG. 1 is a graph depicting the cathodic current efficiency for three different gold electrowinning systems, alkaline cyanide, alkaline cyanide/tributyl phosphate (TBP), and alkaline cyanide/dibutyl butyl phosphonate (DBBP)

A method for extracting gold and silver values from an organic or mixed organic/aqueous system through employment of electrodeposition has been invented. In particular, oxides of phosphorus and sulfur, as disclosed in the parent application, are utilized as extractants for recovering gold and silver from aqueous systems containing gold or silver cyanide anions. This invention recovers the metallic gold and silver values by electrolytic deposition directly from such organic phase or from such organic phase dispersed in an aqueous medium.

To practice the invention, gold or silver cyanide anions must first be extracted from an impure aqueous solution. The extractants and methods used for this solvation extraction are those described in the parent patent application. Generally, the method involves physically contacting the gold or silver cyanide-bearing aqueous system with a solvating extractant at a pH of above 7. The organic solvating extractants used include organic phosphorus oxides such as esters of alkyl phosphoric, phosphonic, and phosphinic acids, phosphine oxides; and sulfur oxides such as organic sulfoxides or sulfones.

The above listed organic phosphorus and sulfur oxides are generally of the lower alkyl class, having one to ten carbons, but preferably for the practice of this invention, less than about six carbon atoms per alkyl chain. Typical phosphorus oxides useful in the practice of the instant invention would be tributyl phosphate (TBP), dibutyl butyl phosphonate (DBBP), butyl dibutyl phosphinate, tributyl phosphine oxide, and trioctyl phosphine oxide.

Some of the phosphorus oxides, such as trioctyl phosphine oxide, are solids at room temperature and must either be melted or dissolved in an appropriate organic solvent before the practice of this invention can be accomplished; i.e., the solvating extractant must be in liquid form.

The aqueous phase is then separated by phase separation from the organic solvating extractant. Electrodes are then placed in the pure organic phase and current is applied. The current density is controlled at about $1.0 \times 10^{-3}$ amp/cm$^2$ to about $3.4 \times 10^{-2}$ amp/cm$^2$, with $2.0 \times 10^{-3}$ amp/cm$^2$ being optimal. The voltage is controlled at between 3.0 to 4.0 volts, with voltages nearing the lower end of the range being optimal. The temperature of the solution is preferably maintained above about 45° C. to about 60° C.

Essentially any inert cathode is compatible with the invention. Satisfactory results should be obtained with cathodes of titanium, stainless steel, carbon and gold.

Also, instead of electrowinning from the organic extractant only, it has been found to be desirable to disperse an aqueous electrolyte in the organic extractant. The aqueous solution should be of high ionic strength, typically controlled with K$_2$HPO$_4$, although other salts may be used. The current voltage (2.0 to 3.0), temperature (45° C. to 60° C.) and cathode requirements remain essentially the same with the mixed organic-/aqueous system as those used with the pure organic extractant system, although the voltage is not as high.

Gold, silver, and other metal values are deposited on the cathode. The invention is selective in that gold and silver are extracted more thoroughly than other metal ions.

The time necessary to practice the invention is dependent on the surface area of the cathode used, the number of cathodes used, the gold concentration of the solution, and the occurrence of any stirring or agitation of the solution during electrodeposition.

The gold and silver values are deposited on the cathode in a smooth, bright sheet that can be easily removed. The deposited metal is relatively pure due to the invention's selectivity for gold and silver values.

Figure 2:
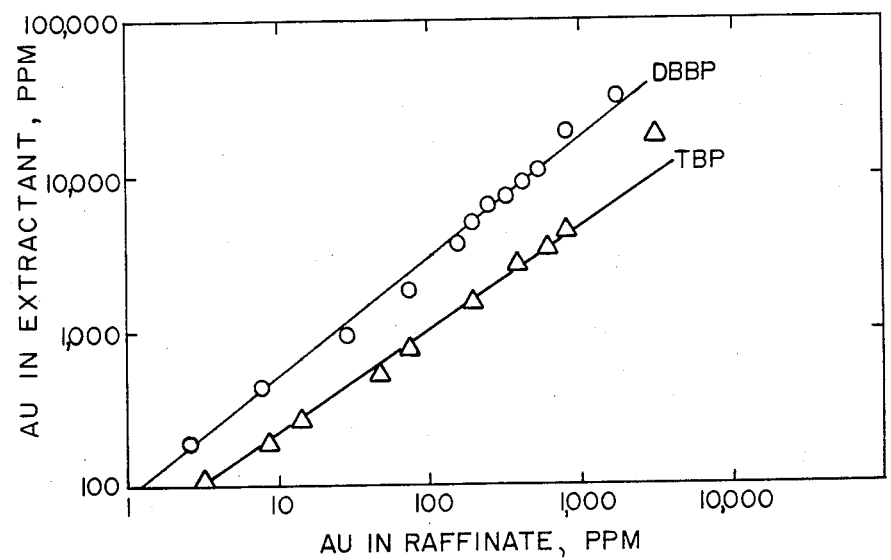
FIG. 2 is a graph depicting the high gold loading capacity of DBBP and TBP.

The current efficiency for gold recovery from the practice of this invention is comparable to the current efficiency for gold recovery from an aqueous solution, as shown in FIG. 1. In view of the fact that electrodeposition from aqueous solutions is usually accomplished at gold concentrations less than 5 g/l for carbon eluates, the current efficiency for such conditioner is typically 50%. In the case of the solvation extraction, the gold concentration can be as high as 30 g/l (FIG. 2) and the current efficiencies for the instant invention are therefore significantly higher.

The invention as practiced has at least three advantages over current industry practices. It obviates two distinct steps from the current process and allows for the ready recirculation of the solvation extractant so that it may be quickly reused.

The first step obviated by the instant invention is stripping the complexed gold from the solvating extractant back into an aqueous phase for later recovery and refining. The organic solvating extractant is directly electrowon without the need for water stripping of the extractant, recovering the gold or silver salts from the aqueous solution by electrowinning or some other method, and refining.

Figure 3:
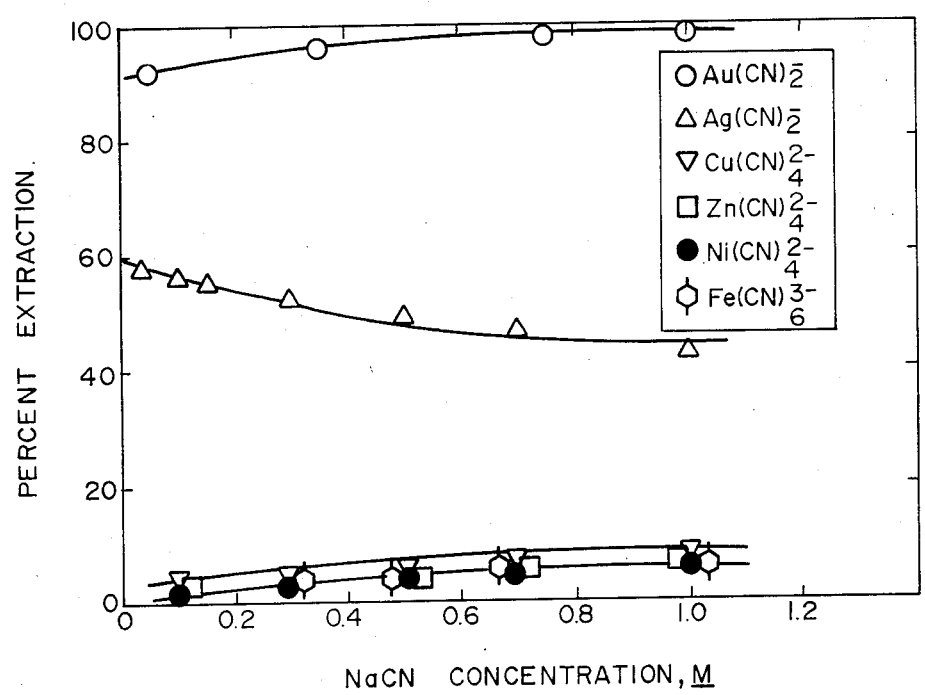
FIG. 3 is a graph depicting the percent extraction of various cyanoanions by DBBP as a function of cyanide concentration at 0.1M NaOH.

The second step eliminated from the present industry process by the instant invention is the refining of the metal deposited on the cathode. When an extractant which in itself selectively extracts silver and gold greater than other metals is used, such as DBBP (see FIG. 3), the resulting silver and gold deposited at the cathode is relatively pure. This selectivity obviates the need for refining to dorébullion obtained from the steel wool and traditional electrowinning as described previously.

A third advantage of the instant invention is that the chemical composition of the solvating extractant is unaltered, so that the solvating extractant may be readily recirculated back to the aqueous extraction phase of the process to be reused. The electrowinning from the organic phase merely recovers the gold and silver values, leaving the extractant substantially unaffected, although some increase in cyanide concentration may occur when the gold or silver is removed.

EXAMPLE I

A waste plating solution such as those discarded from jewelry or electronics manufacturers was contacted with 100% DBBP in a 1:1 ratio at room temperature for 30 minutes. The extent of extraction was determined by semi-quantitative chemical analysis as indicated below:

| Element | Initial Concentration (ppm) | Concentration (ppm) After Extraction | Percent Extracted |
| --- | --- | --- | --- |
| Au | 2280 | 108.0 | 95.3% |
| Ag | 36 | 8.2 | 77.2% |
| Co | 9 | 6.0 | 33.3% |
| Cu | 877 | 611.0 | 30.3% |
| Fe | 114 | 78.0 | 31.6% |
| Ni | 376 | 263.0 | 29.3% |
| Pb | 146 | 106.0 | 27.4% |
| Si | 82 | 57.0 | 30.5% |
| Zn | 1810 | 1250.0 | 30.9% |

A shorter time or multiple stages should yield even better results. The DBBP with dispersed aqueous electrolyte was stirred and subsequently subjected to electrowinning at $2.5 \times 10^{-3}$ amps/cm$^2$ at 2.0 to 2.5 volts for 2 hours, using a stainless steel plate cathode at 45° C.

EXAMPLE II

A different waste electroplating solution was obtained and subsequently contacted with 100% DBBP in a 1:1 ratio for 30 minutes at room temperature. The extent of extraction was determined by semi-quantitative chemical analysis as indicated below:

| Element | Initial Concentration (ppm) | Concentration (ppm) After Extraction | Percent Extracted |
| --- | --- | --- | --- |
| Au | 730 | 8.5 | 98.8% |

| Element | Initial Concentration (ppm) | Concentration (ppm) After Extraction | Percent Extracted |
|---|---|---|---|
| Ag | 47 | 6.8 | 85.5% |
| Co | 1 | <1 | N/A |
| Cu | 700 | 39.3 | 43.8% |
| Fe | 3 | 2.0 | 33.3% |
| Ni | 105 | 57.0 | 45.7% |
| Pb | 71 | 38.0 | 46.5% |
| Si | 8 | 7.0 | 12.5% |
| Zn | 14 | 7.0 | 50.0% |

The DBBP with dispersed aqueous electrolyte was stirred and subsequently subjected to electrowinning at $2.5 \times 10^{-3}$ amps/cm$^2$ at 2.0 to 2.5 volts for 2 hours using a stainless steel plate cathode at 45° C.

As can be seen from these results, extraction of all values (except silicon) increased in this second experiment. The preference for gold and silver appears significantly greater than for any other value contained in the DBBP solution.

We claim:

1. A method for recovering gold or silver values from an organic liquid containing gold or silver cyanide complexes, comprising electrodepositing said gold or silver values onto a cathode immersed in said organic liquid.

2. The method of claim 1 wherein said organic liquid is a dispersion of organic and aqueous phases.

3. The method of claim 1 or claim 2 wherein said organic liquid comprises an organic phosphorus oxide or an organic sulfur oxide.

4. The method of claim 3 wherein said organic phosphorus oxide is a lower alkyl phosphorus oxide, wherein said alkyl portions comprise alkyl groups having from one to ten carbon atoms, and preferably less than six carbon atoms.

5. The method of claim 4 wherein said organic phosphorus oxide is selected from the class consisting of tributyl phosphate, dibutyl butyl phosphonate, butyl dibutyl phosphinate, tributyl phosphine oxide, and trioctyl phosphine oxide and wherein any solid organic phosphorus oxide is in solution in an appropriate organic solvent.

6. The method of claim 3 wherein said organic sulfur oxide is a lower alkyl sulfur oxide, wherein said alkyl portions comprise alkyl groups having from one to ten carbon atoms, and preferably less than six carbon atoms.

7. The method of claim 6 wherein said organic sulfur oxide is an organic sulfoxide or sulfone.

8. The method of claim 2 wherein said dispersed organic/aqueous system is an emulsion.

9. The method of claim 2 wherein said dispersed organic/aqueous system is a suspension.

10. The method of claim 1 or claim 2 wherein said electrodeposition is conducted at a current density of about $2.0 \times 10^{-2}$ amp/cm$^2$ to abut $1.0 \times 10^{-2}$ amp/cm$^2$.

11. The method of claim 1 or claim 2 wherein said electrodeposition is conducted at a voltage of about 2.0 to about 3.0 volts.

12. The method of claim 1 or claim 2 wherein said cathode is stainless steel.

13. The method of claim 1 or claim 2 wherein said cathode is gold.

14. The method of claim 1 or claim 2 wherein said cathode is titanium.

15. The method of claim 1 or claim 2 wherein said cathode is carbon.

* * * * *